US009206880B2

(12) United States Patent
Kalisz et al.

(10) Patent No.: US 9,206,880 B2
(45) Date of Patent: Dec. 8, 2015

(54) ELECTRIC MACHINE INCLUDING AN AXIAL RETAINER

(71) Applicant: REMY TECHNOLOGIES, L.L.C., Pendleton, IN (US)

(72) Inventors: Mariusz Kalisz, Fishers, IN (US); Christopher Hunt, Greenfield, IN (US); Lynsey Liguori, Lebanon, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 191 days.

(21) Appl. No.: 14/178,373

(22) Filed: Feb. 12, 2014

(65) Prior Publication Data

US 2014/0260740 A1 Sep. 18, 2014

Related U.S. Application Data

(60) Provisional application No. 61/790,218, filed on Mar. 15, 2013.

(51) Int. Cl.
*F16H 1/02* (2006.01)
*F16D 1/10* (2006.01)
*F16D 1/116* (2006.01)
*F16D 1/12* (2006.01)

(52) U.S. Cl.
CPC .. *F16H 1/02* (2013.01); *F16D 1/10* (2013.01); *F16D 1/116* (2013.01); *F16D 1/12* (2013.01); *F16D 2001/103* (2013.01); *Y10T 74/19614* (2015.01)

(58) Field of Classification Search
None
See application file for complete search history.

(56) References Cited

U.S. PATENT DOCUMENTS

| 5,277,075 | A | 1/1994 | Sakamoto et al. |
| 5,370,009 | A | 12/1994 | Isozumi |
| 6,129,648 | A * | 10/2000 | Tanioka ............ F16H 1/46 475/331 |
| 7,996,135 | B2 | 8/2011 | Ishii et al. |
| 2003/0102737 | A1 | 6/2003 | Fulton et al. |
| 2013/0139645 | A1* | 6/2013 | Nagy ............ F02N 15/02 74/7 E |

FOREIGN PATENT DOCUMENTS

KR 2003774010000 Y1 3/2005

OTHER PUBLICATIONS

International Search Report and Written Opinion for PCT Application No. PCT/US2014/018947, dated Apr. 29, 2014, pp. 1-9.

* cited by examiner

*Primary Examiner* — William Kelleher
*Assistant Examiner* — Randell J Krug
(74) *Attorney, Agent, or Firm* — Cantor Colburn LLP

(57) ABSTRACT

An electric motor includes a gear assembly having at least one gear arranged within a stationary gear support. The stationary gear support includes an outer surface having an axial retainer mounting element. A drive shaft is operatively coupled to the at least one gear. An output shaft includes a first end and a second end. The second end is operatively coupled to the drive shaft. The output shaft is axially shiftable relative to the drive shaft in a first direction and in an opposing second direction. A clutch assembly is supported on the second end of the output shaft. The clutch assembly includes a clutch shell having a first end and a second end. An axial retainer is detachably mounted to the axial retainer mounting element. The axial retainer is configured and disposed to engage the second end of the clutch shell to limit axial travel of the clutch assembly.

17 Claims, 1 Drawing Sheet

US 9,206,880 B2

ELECTRIC MACHINE INCLUDING AN AXIAL RETAINER

CROSS-REFERENCE TO RELATED APPLICATION

This application is a Non-Provisional of U.S. Provisional Application Ser. No. 61/790,218 filed Mar. 15, 2013, the disclosure of which is incorporated by reference herein in its entirety.

BACKGROUND OF THE INVENTION

Exemplary embodiments pertain to the art of electric machines and, more particularly, to an electric machine having an axial retainer.

Vehicles that employ internal combustion engines generally include a starter motor. In most cases, vehicles employ an electric starter motor to initiate operation of the internal combustion engine. The electric starter motor includes an armature that rotates in response to a magnetic motive force that is set up between armature windings and provided by a stationary field. The armature is coupled to a drive and shaft assembly having pinion gear that is configured to engage with a ring gear on the internal combustion engine. A solenoid drives the drive and shaft assembly along with the pinion gear into the ring gear to start the internal combustion engine.

BRIEF DESCRIPTION OF THE INVENTION

Disclosed is an electric motor including a frame and an armature rotatably mounted within the frame. The armature includes a shaft. A field including a plurality of windings is mounted to the frame. A gear assembly is coupled to the shaft. The gear assembly includes at least one gear arranged within a stationary gear support. The stationary gear support includes an outer surface having an axial retainer mounting element. A drive shaft is operatively coupled to the at least one gear. An output shaft includes a first end and a second end. The second end is operatively coupled to the drive shaft. The output shaft is axially shiftable relative to the drive shaft in a first direction and in an opposing second direction. A clutch assembly is supported on the second end of the output shaft. The clutch assembly includes a clutch shell having a first end section and a second end section. An axial retainer is detachably mounted to the axial retainer mounting element. The axial retainer is configured and disposed to engage the second end of the clutch shell to selectively limit axial travel of the clutch assembly in the second direction.

Also disclosed is a starter motor including a frame and a shaft rotatably mounted within the frame. A gear assembly is coupled to the shaft. The gear assembly includes at least one gear arranged within a stationary gear support. The stationary gear support includes an outer surface having an axial retainer mounting element. A drive shaft is operatively coupled to the at least one gear. An output shaft includes a first end and a second end. The second end is operatively coupled to the drive shaft. The output shaft is axially shiftable relative to the drive shaft in a first direction and in an opposing second direction. A clutch assembly is supported on the second end of the output shaft. The clutch assembly includes a clutch shell having a first end section and a second end section. An axial retainer is detachably mounted to the axial retainer mounting element. The axial retainer is configured and disposed to engage the second end of the clutch shell to selectively limit axial travel of the clutch assembly in the second direction.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
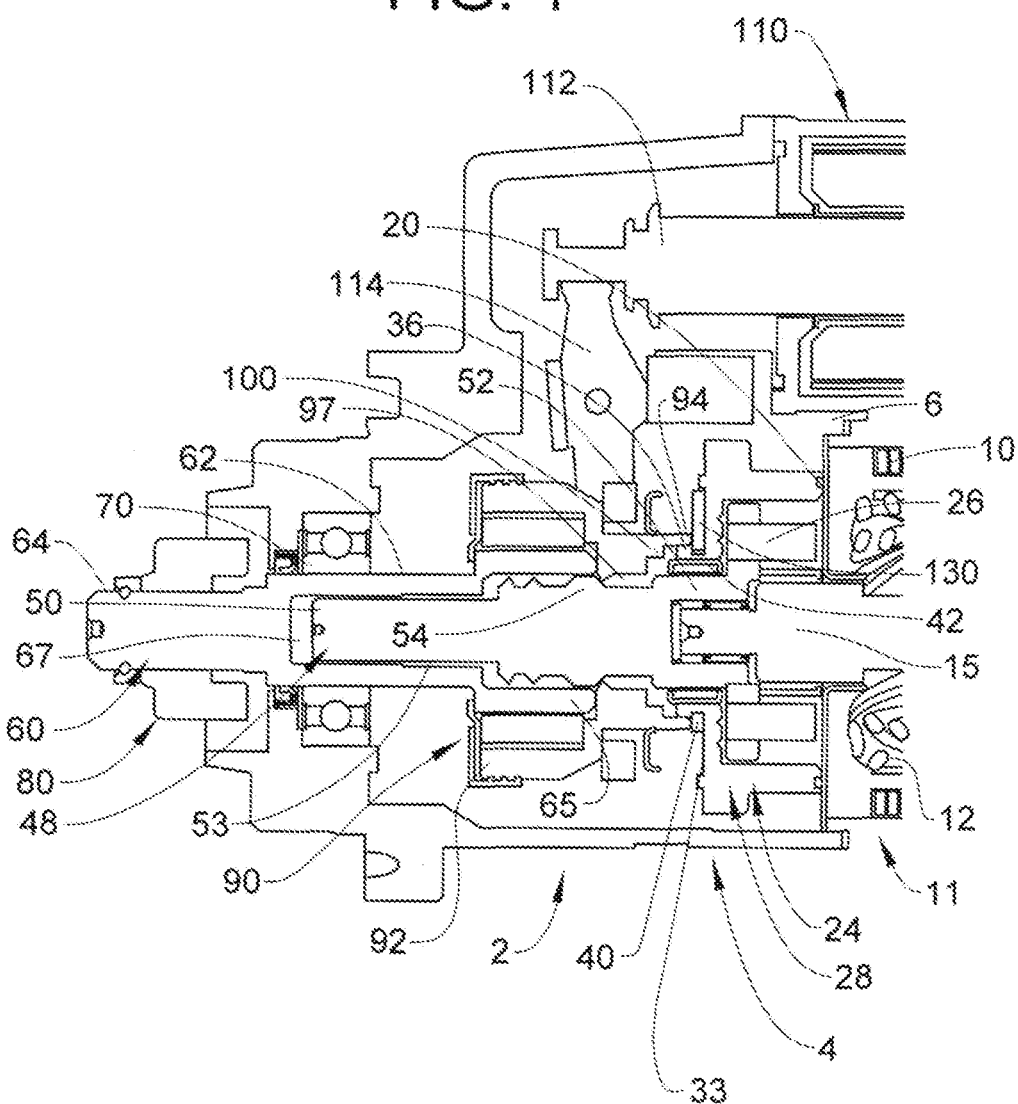
FIG. 1 depicts a partial cross-sectional side view of an electric machine having an axial retainer in accordance with an exemplary embodiment.

An electric machine, shown in the form of a starter motor for internal combustion engines, is indicated generally at 2 in FIG. 1. Electric machine 2 includes a housing 4 having an interior portion 6. A stationary field 10 is mounted to a frame 11 supported to an internal surface of housing 4. An armature 12 is rotatably supported within frame 11 and surrounded by field 10. Armature 12 includes a shaft 15. A shield 20 extends across interior portion 6 adjacent an axial end (not separately labeled) of field 10 and armature 12. Shield 20 separates field 10 and armature 12 from a gear assembly 24.

Gear assembly 24 includes one or more gears 26 surrounded by a stationary gear support 28. Stationary gear support 28 includes an outer surface 33 having a hub portion 36. Hub portion 36 includes an axial retainer mounting element 40 that takes the form of an annular groove 42. A drive shaft 48 is operably coupled to gear assembly 24. Drive shaft 48 includes a first end portion 50 that extends to a second end portion 52. Drive shaft 48 includes an outer surface 53 that supports a plurality of splines 54. Output shaft 60 includes an outer surface 62 that extends between a first end 64 and a second end 65 having a central passage 67. Central passage 67 includes an inner surface (not separately labeled) that is axially slidable on outer surface 53. Output shaft 64 extends through and is rotatably supported by a bearing 70 mounted in frame 4. First end 64 of output shaft 60 supports a pinion gear 80. With this arrangement, output shaft 60 is axially shiftable relative to drive shaft 48 in a first direction, urging pinion gear 80 into meshing engagement with, for example, a ring gear (not shown) provided on a fly wheel. Output shaft 60 is also axially shiftable relative to drive shaft 48 in a second direction, opposite to the first direction, to return pinion gear 80 to a ready position.

A clutch assembly 90 is mounted to outer surface 62 of output shaft 60. Clutch assembly 90 facilitates engagement and disengagement of pinion gear 80 with a ring gear (not shown). Clutch assembly 90 includes a first end section 92 that extends to a second end section 94. Second end section 94 includes a recessed opening 97 that extends about hub portion 36 of stationary gear support 28 when pinion gear 80 is in the ready position as shown. Recessed opening 97 includes an annular step 100 that abuts hub portion 36 during assembly as will be discussed more fully below. Electric machine 2 is further shown to include a solenoid 110 having a plunger 112 coupled to an actuator 114. Actuator 114 is coupled to clutch assembly 90. When energized, actuator 114 acts upon clutch assembly 90 to urge output shaft 60 axially relative to driveshaft 48 in the first direction. Specifically, actuator 114 shifts pinion gear 80 from the ready position (illustrated in FIG. 1) to an operational position (not shown). When de-energized, plunger 112 extends pivoting actuator 114 to axially shift output shaft 60 relative to drive shaft 48 in the second direction to return pinion gear 80 to the ready position.

During assembly of electric machine 2, often times it is desirable to establish a particular orientation of output shaft 60 relative to drive shaft 48. In order to establish the desired orientation, output shaft 60 is shifted in the second direction causing annular step 100 to abut hub portion 36. In this position, splines 54 on drive shaft 48 disengage from the splines (not separately labeled) in clutch 90. At this point, output shaft 60 may be rotated relative to drive shaft 48 to establish the desired orientation. After assembly, it is desirable to limit axial travel of output shaft 60 in the second direction to ensure continued engagement of splines 54 and the splines (not separately labeled) in clutch 90 coupled with output shaft 60.

Figure 2:
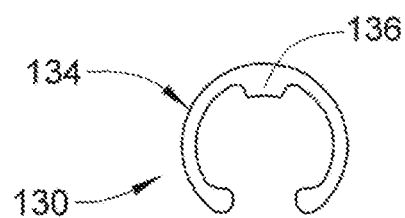
FIG. 2 depicts an axial retainer in accordance with an aspect of the exemplary embodiment.

In accordance with an exemplary embodiment, electric machine 2 includes an axial retainer 130 mounted to axial retainer mounting element 40. Axial retainer 130 serves as a spacer that limits axial travel of output shaft 60 and clutch 90 in the second direction. In accordance with an aspect of the exemplary embodiment, axial retainer 130 takes the form of a spring clip 134 that nests within annular groove 42. Spring clip 134 may take on a variety of forms including an E-type clip 136 as shown in FIG. 2. Axial retainer 130 may also be U-Shaped and formed about axial retainer mounting element 40 during assembly. When pinion gear 80 is in the ready position, second end section 94 of clutch assembly 90 abuts axial retainer 130. In this manner, clutch assembly is restrained from moving further in the second direction ensuring that splines 54 remain inter-engaged with the splines on clutch 90.

At this point, it should be understood that the exemplary embodiment provides a mechanism for limiting axial travel of a shaft in a machine. In addition to limiting axial travel, the particular position of the axial retainer allows for an increase in size of the clutch assembly without requiring a corresponding increase in the starter motor. Specifically, locating the axial retainer on the gear support advantageously allows designers to scale up the clutch assembly to enable the starter motor to be employed in more powerful engines without increasing an overall size of the frame. Further, mounting the axial retainer on a stationary component allows for the use of a wider range of construction materials. Mounted to a stationary component, axial retainer is not subjected to any centrifugal forces. As such, lighter materials may be employed in the construction of the axial retainer without sacrificing functionality. The use of lighter materials coupled with mounting to a stationary component increases an overall operational life of the axial retainer.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
  a frame;
  an armature rotatably mounted within the frame, the armature including a shaft;
  a gear assembly coupled to the shaft, the gear assembly including at least one gear arranged within a stationary gear support, the stationary gear support including an outer surface having an axial retainer mounting element;
  a drive shaft operatively coupled to the at least one gear;
  an output shaft including a first end and a second end, the second end being operatively coupled to the drive shaft, the output shaft being axially shiftable relative to the drive shaft in a first direction and in an opposing second direction;
  a clutch assembly supported on the second end of the output shaft, the clutch assembly including a clutch shell having a first end section and a second end section; and
  an axial retainer detachably mounted to the axial retainer mounting element, the axial retainer being configured and disposed to engage the second end of the clutch shell to selectively limit axial travel of the clutch assembly in the second direction.

2. The electric machine according to claim 1, wherein the axial retainer comprises a spring clip.

3. The electric machine according to claim 2, wherein the spring clip comprises an E-type clip.

4. The electric machine according to claim 1, wherein the axial retainer is formed about the axial retainer mounting element.

5. The electric machine according to claim 1, wherein the outer surface of the stationary gear support includes a hub portion having an annular groove that defines the axial retainer mounting element.

6. The electric machine according to claim 5, wherein the second end section of the clutch shell includes a recessed opening configured and disposed to receive the hub portion.

7. The electric machine according to claim 6, wherein the recessed opening includes an annular step configured and disposed to abut the hub portion when the axial retainer is removed.

8. The electric machine according to claim 1, further comprising: a solenoid mounted to the frame, the solenoid including an actuator operatively connected to the clutch shell.

9. A starter motor comprising:
  a frame;
  a shaft rotatably mounted within the frame;
  a gear assembly coupled to the shaft, the gear assembly including at least one gear arranged within a stationary gear support, the stationary gear support including an outer surface having an axial retainer mounting element;
  a drive shaft operatively coupled to the at least one gear;
  an output shaft including a first end and a second end, the second end being operatively coupled to the drive shaft, the output shaft being axially shiftable relative to the drive shaft in a first direction and in an opposing second direction;
  a clutch assembly supported on the second end of the output shaft, the clutch assembly including a clutch shell having a first end section and a second end section; and
  an axial retainer detachably mounted to the axial retainer mounting element, the axial retainer being configured and disposed to engage the second end of the clutch shell to selectively limit axial travel of the clutch assembly in the second direction.

10. The starter motor according to claim 9, wherein the axial retainer comprises a spring clip.

11. The starter motor according to claim 10, wherein the spring clip comprises an E-type clip.

12. The starter motor according to claim 9, wherein the axial retainer is formed about the axial retainer mounting element.

13. The starter motor according to claim 9, wherein the outer surface of the stationary gear support includes a hub portion having an annular groove that defines the axial retainer mounting element.

14. The starter motor according to claim 13, wherein the second end section of the clutch shell includes a recessed opening configured and disposed to receive the hub portion.

15. The starter motor according to claim 14, wherein the recessed opening includes an annular step configured and disposed to abut the hub portion when the axial retainer is removed.

16. The starter motor according to claim 9, further comprising: a pinion gear mounted to the first end of the output shaft.

17. The starter motor according to claim 9, further comprising: a bearing mounted to the frame, the output shaft extending through and being connected to the bearing.

\* \* \* \* \*